(12) United States Patent
Schneider et al.

(10) Patent No.: US 10,793,074 B2
(45) Date of Patent: Oct. 6, 2020

(54) LOADING SURFACE IN A VEHICLE

(71) Applicant: FORD GLOBAL TECHNOLOGIES, LLC, Dearborn, MI (US)

(72) Inventors: Frank Schneider, Iserlohn (DE); Thomas Loewe, Buchen (DE); Christian Causemann, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 81 days.

(21) Appl. No.: 16/376,838

(22) Filed: Apr. 5, 2019

(65) Prior Publication Data
US 2019/0308559 A1 Oct. 10, 2019

(30) Foreign Application Priority Data
Apr. 6, 2018 (DE) ........................ 10 2018 205 232

(51) Int. Cl.
*B60R 5/04* (2006.01)

(52) U.S. Cl.
CPC ................ *B60R 5/04* (2013.01); *B60R 5/045* (2013.01)

(58) Field of Classification Search
CPC  B60R 5/04; B60R 5/044; B60R 5/045; B60R 7/08
USPC .................................. 296/37.5, 37.14, 37.16
See application file for complete search history.

(56) References Cited

U.S. PATENT DOCUMENTS

| | | | |
|---|---|---|---|
| 6,688,820 | B2 | 2/2004 | Ootsuka |
| 7,370,899 | B2 | 5/2008 | Powers, Jr. et al. |
| 7,661,742 | B2 | 2/2010 | Medlar et al. |
| 8,534,737 | B2 * | 9/2013 | Torres ..................... B60R 5/044 296/37.16 |
| 9,914,399 | B2 * | 3/2018 | Lewis ................... B60P 7/0807 |
| 2013/0175821 | A1 * | 7/2013 | Simon ...................... B60R 7/02 296/37.14 |
| 2015/0054299 | A1 * | 2/2015 | Yoshizawa ............... B60R 5/04 296/37.16 |
| 2018/0290597 | A1 * | 10/2018 | Mejia Perez ........... F16B 5/121 |

FOREIGN PATENT DOCUMENTS

| | | |
|---|---|---|
| EP | 1806261 A1 | 7/2007 |
| EP | 2899070 A1 | 7/2015 |
| WO | 2013178199 A1 | 12/2013 |

OTHER PUBLICATIONS

English Machine Translation of EP2899070A1 dated Jul. 29, 2015.
English Machine Translation of WO2013178199A1 dated Dec. 5, 2013.
"More, Right Down to the Floor"; Nissan; www.nissanusa.com/cars/versa-note; pp. 1-8; printed on Feb. 26, 2019.

* cited by examiner

*Primary Examiner* — Jason S Daniels
(74) *Attorney, Agent, or Firm* — David Coppiellie; Price Heneveld

(57) ABSTRACT

A device is provided for changing the volume of a loading space in a vehicle. The device includes a movable loading surface, a side wall and at least one pivotable support arranged on the side wall. The support has a support surface on which the loading surface is mounted in a raised position. The support is arranged on a pivot axis oriented perpendicularly to the loading surface.

19 Claims, 7 Drawing Sheets

LOADING SURFACE IN A VEHICLE

TECHNICAL FIELD

Figure 1:
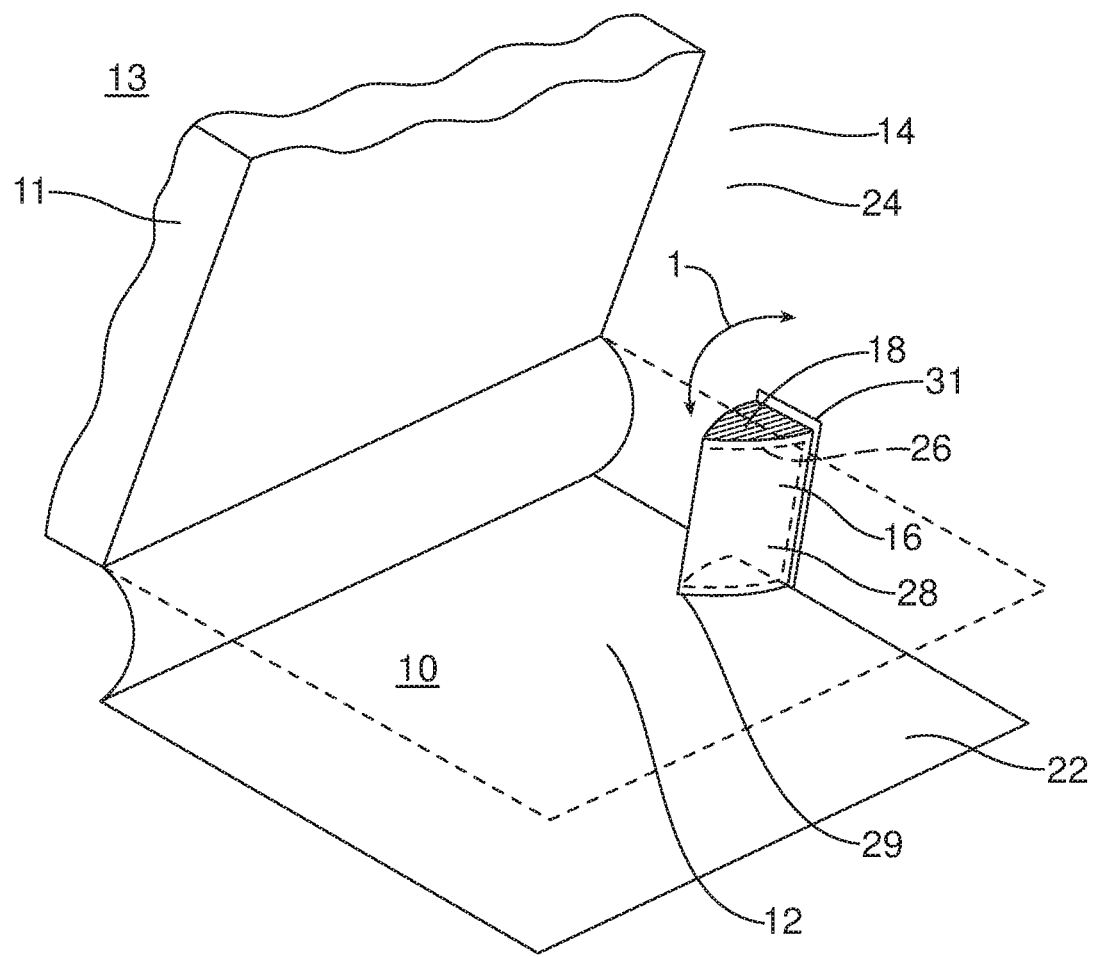

This document relates to a device for changing the volume of a loading space in a vehicle.

BACKGROUND

Loading surfaces for vehicles which are not adjustable in terms of their position in a loading space are known in the art. For example, a loading surface of this kind creates the floor of a luggage compartment in a vehicle. If the floor is deeper than a lower edge of an opening of the luggage compartment, a user must move an object from outside past this lower edge and deposit said object on the floor or else on the loading surface, wherein the lower edge sticks out in an inconvenient manner Alternatively, fixed loading surfaces which are oriented flush with the lower edge of the opening of the luggage compartment are known in the art. A flush loading surface of this kind reduces the luggage compartment volume, as the space below the flush loading surface is not used. As a result, the two positions of the loading surface previously referred to are beset with disadvantages.

EP 2 899 070 A1 discloses a height-adjustable loading surface of a vehicle. The loading surface can be adjusted during an adjustment process into a first storage position and a second storage position. In this case, it is raised in the direction of the loading edge or lowered in relation to the loading edge. For this purpose, brackets which can be folded down in relation to their vertical direction are formed on the left and right below the loading edge. They are folded down from a side wall in such a manner that they form an upwardly open angle with the side wall. More particularly, the brackets are folded about a horizontal axis in relation to the direction of gravitational force. In this way, a support surface is formed for the loading surface, on which support surface the loading surface can be deposited. This embodiment of the height-adjustable loading surface has the disadvantage, however, that heavy loads on the loading surface cause further splaying or even destruction of the bracket. This is because the upwardly open angle of the bracket functions as a lever acting in conjunction with the load on the loading surface to produce a torque. An adjustable loading surface of this kind is particularly unsuitable for bumpy journeys in an all-terrain vehicle, for example.

A similar system with the same disadvantages referred to previously is proposed by WO2013/178199 A1. This device also exhibits a support means which is splayed about a horizontal axis from a side wall, in order to place a loading surface thereupon.

EP 1 806 261 A1 shows a restraining means which is used for restraining a folded-up loading surface in a vehicle. If a loading surface is folded downwards, it is positioned behind the restraining means with its locking function. The spring-mounted restraining means are deflected elastically by means of a ramp. The ramp has a projection which is opposite the folded-up loading surface and retains said loading surface. The retaining means has the same problems as in the preceding proposals, since a tensile force for resetting the folded-up loading surface, for example, would cause splaying or even destruction of the retaining means.

A support means that can likewise be splayed about a horizontal axis is shown in U.S. Pat. No. 7,661,742. The teaching of this document contains a fragile support means on which a storage surface is placed once it is oriented in a perpendicular position to the side wall. A heavy load cannot be placed on the storage surface with this support means, since the fragile support means would inevitably be damaged by the resulting forces. The teaching of U.S. Pat. No. 7,661,742 therefore exhibits the same disadvantages as the preceding proposals.

A solution to the problems of the prior art cannot be found in the field of vehicle trailers either. For example, U.S. Pat. No. 7,370,899 shows a trailer with metal sheets which are attached to side walls by hinges and can in turn be splayed. The metal sheets are placed in a position at right angles to the side wall, in order to arrange a loading surface thereon. These metal sheets are in turn splayed from the side wall in such a manner that they form an angle which is upwardly open. A torque which is produced by a weight on the loading surface invariably leads to further unwanted splaying of the metal sheet.

In order to combat these problems, U.S. Pat. No. 6,688,820 proposes concave portions in the side walls, into which projections of a loading surface can be inserted. However, concave portions of this kind are constantly accessible in the loading space, which means that they become blocked, particularly with consignments of bulk material. Returning the concave portions to an operational state inevitably involves costly cleaning.

SUMMARY

The problem addressed in this document is that of supplying a device which allows a loading surface with a high load to be supported, wherein the device simultaneously allows a change in the volume of the loading space.

The problem is solved by a device for changing a loading space volume of a vehicle according to the features set forth in the following claims.

It should be pointed out that the features and measures individually referred to in the following description can be combined with one another in any technically feasible manner and produce further embodiments of the device. The device is characterized and specified by the description, particularly additionally in connection with the figures.

A device is provided for changing the volume of a vehicle loading space. A loading space of this kind may be a luggage compartment, for example. The loading space has an opening through which objects can be deposited on a loading surface in the loading space. The objects create a load which is placed on the loading surface, wherein the objects have to be carried over a loading edge of the opening. The loading surface forms along with side walls at least part of a delimitation of the volume of the loading space. For example, the volume of a luggage compartment is limited by a loading surface on the floor side and side walls which are arranged on the left and right of the loading surface. In addition, a rear side of a row of seats in a passenger compartment in the vehicle limits the volume of the loading space. In order to be able to increase the volume of the loading space, the loading surface is movably configured between two positions. The loading surface is raised in a first position and may be oriented flush with the loading edge, for example. In a second position, the loading surface is lowered and spaced further apart from the load edge compared with the first position. The volume of the loading space is smaller in the first, raised position than in the second, lowered position.

So that the loading surface can be kept in the first, raised position, at least one support means is provided on each side wall. The support means has a support surface onto which the loading surface can be placed in the first, raised position.

The support surface preferably faces an underfloor of the loading surface. In this case, the loading surface may be a shelf, a fiber-glass-reinforced panel, a plastic panel and/or honeycomb-like lightweight panel.

In order to achieve the advantages set forth herein, it is proposed that the support means should be provided with a pivot axis oriented perpendicularly to the loading surface. In this way, forces which preferably act in the gravitational direction are conducted in the pivoting axis, so that a greater resistance to torque which is produced by the mass of the load and the distance thereof from the side wall prevails compared with a horizontally oriented pivot axis.

In order to convey the loading surface from the first, raised position into the second, lowered position, the support means may be pivoted by hand, for example, from the storage space in the direction of the side walls. If there are two support means to the left and right of the loading surface, the support means can be reached by hand through the storage space opening when a loading surface lying thereon is raised. Once the support means have been pivoted in and no longer project into the loading space, the loading surface can be lowered until it is deeper than the support surfaces. An edge of the loading surface comes to rest alongside a support means in the second, lowered position and holds the support means in a pivoted-in position. In this second, lowered position, the loading surface is arranged below the support surface and the volume of the loading space is greater compared with the first, raised position in which the loading surface lies on the support surface.

In a preferred embodiment, the device is provided with a pivot axis having a hinge-like configuration. In this case, a bolt is guided through at least two bushings. At least one bushing is assigned to the support means and at least one other bushing is arranged in the region of the side wall. The bushings are arranged axially flush with one another, wherein the bolt can be inserted through the bushings. The hinge allows a very efficient movement of the support means.

A spring which is preferably configured as a torsional spring can be attached to the pivot axis. The torsional spring produces a pretensioning of the support means in the direction of the loading space. If, for example, the movable loading surface is raised above the support means, the support means can automatically pivot through the pretensioning of the spring into the loading space and be positioned below the loading space. For example, a loading space which is located in the second, lowered position can be raised by hand, wherein the support means are automatically moved by the springs into a pivoted-out position in which the support surfaces project into the loading space. The loading surface can be deposited on the support surfaces and moved into the first, raised position. The entire course for the arrangement in the first, raised position may take place with only one hand in this case, so that a second hand can be used to transport and deposit a load on the loading surface, for example. One-handed operation can therefore be achieved with the device. The automatic pivoting-out of the support means can be initiated by a hand action. For example, the automatic pivoting movement can be produced by pressure in the pivoting direction or by lifting in the vertical direction.

A clever alternative embodiment of the device contains a locking means which is preferably arranged within the pivot axis. The locking means allows the support means to lock in a limited position and thereby resists a possible spring force which produces pretensioning in the direction of the loading space. The locking means may be configured as an axial projection on one of the bushings of the hinge, for example. A bushing opposite the bushing fitted with the projection may, for example, have a complementary recess for receiving the projection in a limited position of the support means. If the support means is pivoted in until the support surface no longer projects into the loading space, the projection can engage with the complementary recess and prevent the support means from pivoting out into the storage space. As an alternative to the complementary recess, a ramp-like axial form on the bushing is conceivable, for example, wherein the projection slides along the ramp-like axial form until it reaches one end of the ramp. At this end of the ramp, the projection may engage behind the ramp, for example, or come to rest on a latching plane which does not have a sloping surface, and prevent any pivoting-out into the loading space. This is particularly advantageous when the loading surface is raised via the support means and the support means only has to be moved with one hand into a pivoted-in position. Hence, for example, in the case of two support means only the one support means and thereafter the other support means can be engaged with one hand, while the loading surface is held with the other hand via the support means. Alternatively, the support means can be engaged in the pivoted out position. This may take place by means of the same measures. Engagement in the pivoted-out position may take place instead of, or in addition to, engagement in the pivoted-in position.

In order to achieve a pivoting-out of an engaged support means, the support means could be raised so far in the axial direction of the pivot axis that the projection is raised from the complementary recess or via the ramp. The raising of the support means can be produced either by means of a hand-generated force or by the force of a pressure spring. The pressure spring may be fitted in the pivot axis. A helical spring which is arranged coaxially to the pivot axis is preferably conceivable as the pressure spring. The pressure spring may be fitted between two bushings of a hinge and therefore produce an axial force between the bushings which produces a relative movement of the bushings along the axial direction of the pivot axis. Alternatively, a disengagement ramp may be provided which brings about an unlocking by pressing or pulling on the support means in its pivoting direction. It is also possible for the torsional spring to be combined with the pressure spring.

Furthermore, it may favorably be provided that the pivot axis is supported on an underfloor below the loading surface. The underfloor below the loading surface is preferably of robust design and may have a special form for supporting the pivot axis. Separate supporting bearings on the underfloor or brackets for supporting on a side wall of the vehicle may also be provided below the pivot axis. In particular, the pivot axis is oriented perpendicularly to the underfloor and/or to a supporting structure, so that forces directed into the pivot axis are completely absorbed by the underfloor and/or the supporting structure. In the case of a pivot axis which has a hinge with a bolt, the bolt may have a support bearing on at least one downwardly oriented axial end which rests against the underfloor. The supporting bearing may also constitute a bearing for the pivoting movement of the support means. The loading surface is preferably deposited on the underfloor in its second position.

In addition, the pivot axis may be arranged within a side trim panel on the side wall. The side trim panel is preferably arranged on a side of the side wall facing the loading space. The side trim panel may be made of plastic and/or leather and/or a fabric. In particular, the side trim panel has an inwardly facing felt-like covering. The pivot axis in this case cannot be seen viewed from the loading space. This can be achieved by the pivot axis being arranged in the side trim panel itself or behind the side trim panel. If the pivot axis is formed by means of a hinge, for example, this hinge is fitted behind or within the side trim panel. The hinge may also be covered by a faceplate which is preferably made of the same material as the side trim panel. In this way, sensitive components of the device are arranged under protected conditions behind the side trim panel to support the loading surface.

Advantageously, the support means has the support surface on its upwardly facing side. The support surface may be arranged at one end of the support means which is furthest away from the underfloor. In this way, the support means is not visible and is also not accessible in a first, raised position of the loading surface in the loading space, which means that an accidental pivoting-in of the support means due to an unwanted displacement of a load on the loading surface, for example, does not take place. In an advantageous development, the support means projects from the side trim panel in the first, pivoted-out position and is completely countersunk within the side trim panel in the second, pivoted-in position. In this way, the support means can fit tightly around the contour of the side trim panel.

In addition, the support surface preferably has a triangular contour. In particular, if the support means is pivoted into the loading space, an apparently triangular support surface emerges. One corner of the support surface is preferably arranged on the pivot axis, so that the support surface is pivoted about this corner. In a preferred embodiment, the support surface is configured perpendicularly to the pivot axis. A loading surface which interacts with a support surface of this kind is likewise oriented perpendicularly to the pivot axis in its first, raised position when it lies on the support surface. In its second, lowered position, the loading surface is positioned lying preferably on the underfloor between the support means below the support surface.

A preferred embodiment of the device may provide that the support means likewise has a triangular contour preferably identical to the support surface. A support means of this kind is columnar in design, for example, wherein the column has a triangular cross section. The entire support means with its triangular cross section is pivoted in and pivoted out in this case. A space-saving and yet stable structure for the support means is proposed through the triangular cross section.

So that the statics of the loaded support means are further improved, the support means may advantageously rest with at least one support point or one support surface on the underfloor. This support point may, for example, be on a corner of the triangular support means. The support point is preferably the furthest point of the pivoted-out support means from the pivot axis. In this way, a torque generated by a load is optimally opposed on the support means.

A projection may be advantageously provided on a side of the support means on the loading space side, which projection is abutted by the edge of the loading surface in the second, lowered position. The projection is lifted from the side of the support means on the loading space side, so that the side on the loading space side is spaced apart from the edge of the loading surface. In particular, the projection should be of such dimensions that the side on the loading space side is displaced inwardly into the side trim panel, so that a small offset between an outside of the side trim panel and the side on the loading space side is produced. The size of the projection in the transverse direction of the loading space may be roughly 4 mm. Cleverly, the projection has a wedge-like or conical shape. The wedge-like extension of the projection means that the support surface is extended, so that a particularly resistant support of the support means is achieved. The conical or wedge-like design is also used for the self-locking of an unwanted rotation of the loading floor support.

BRIEF DESCRIPTION OF THE DRAWING FIGURES

Figure 2:
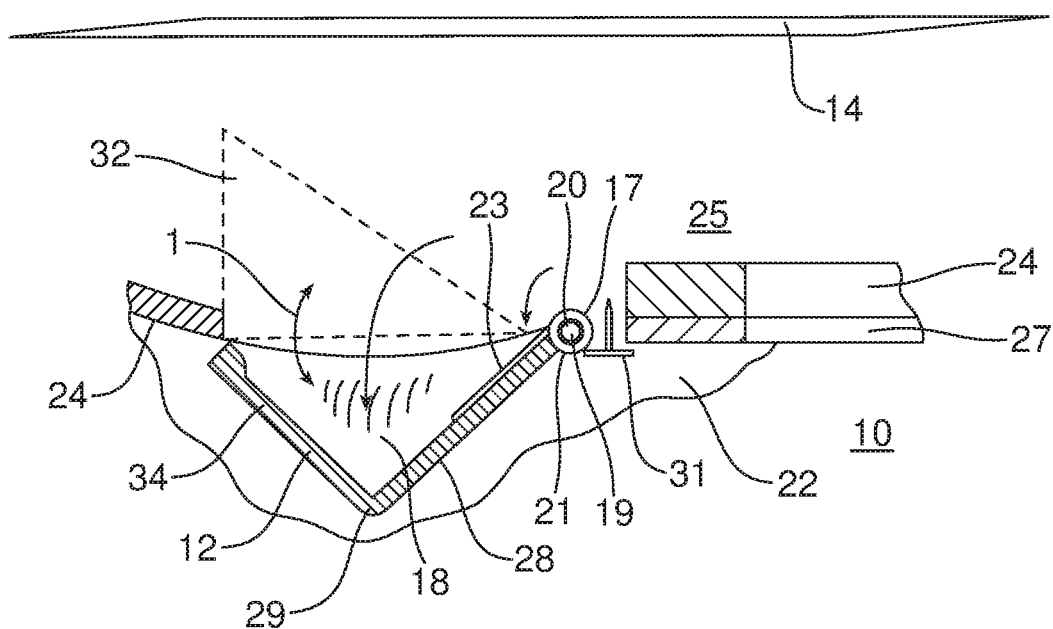
Figure 3:
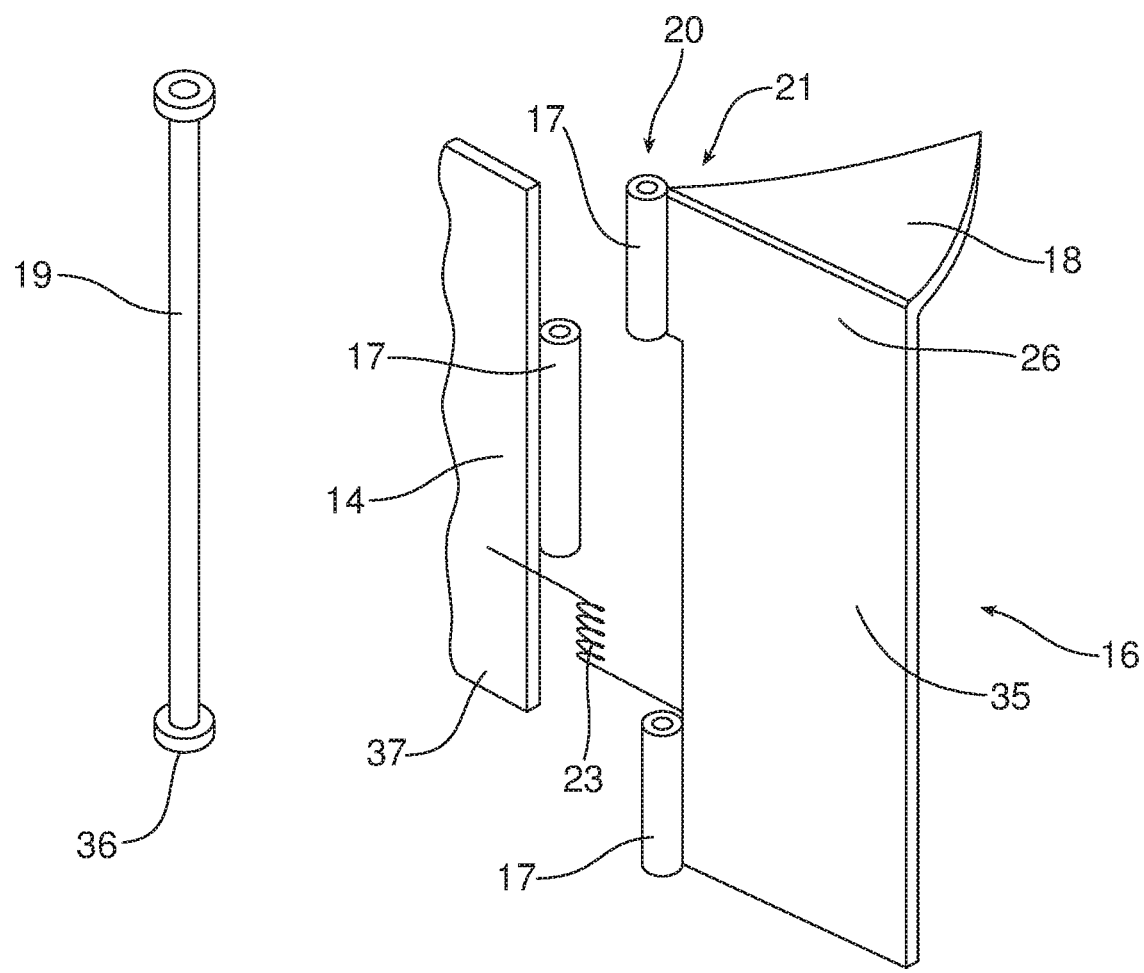
Figure 4:
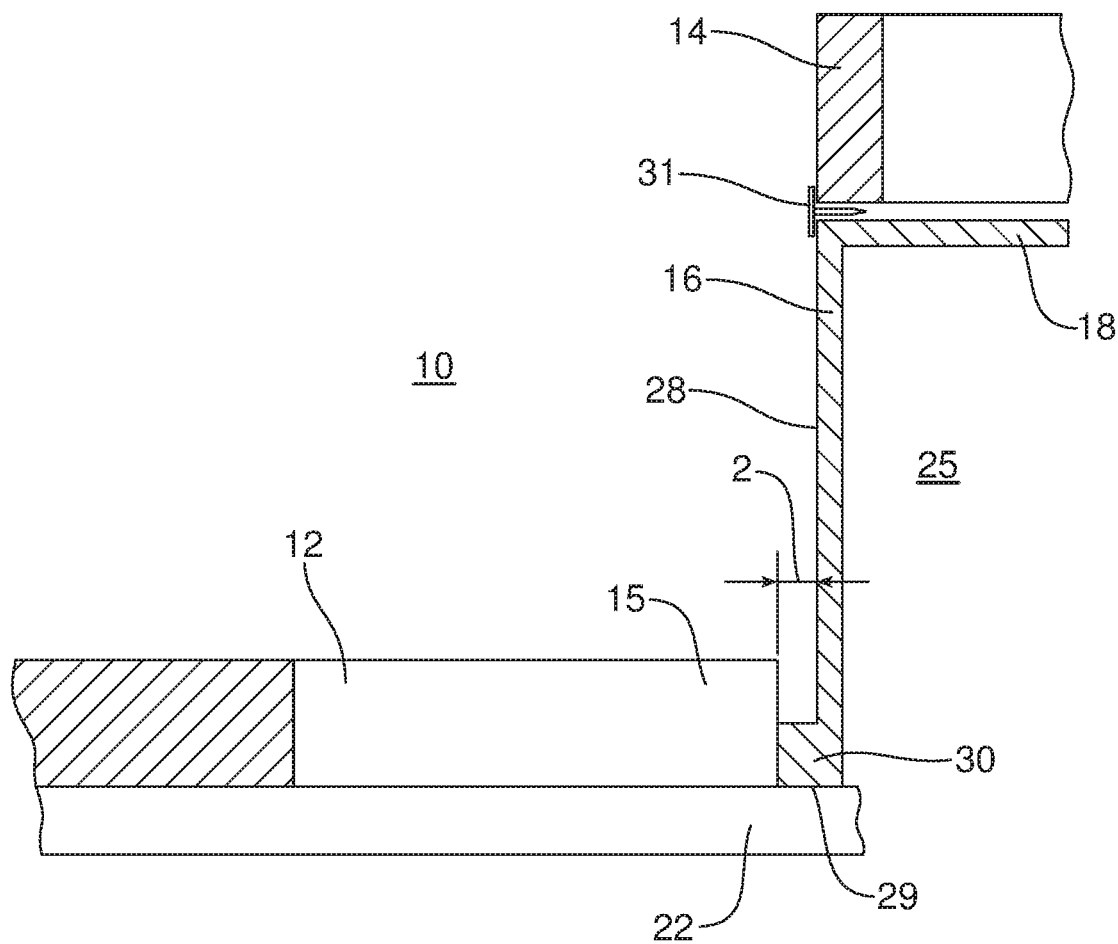
Figure 5:
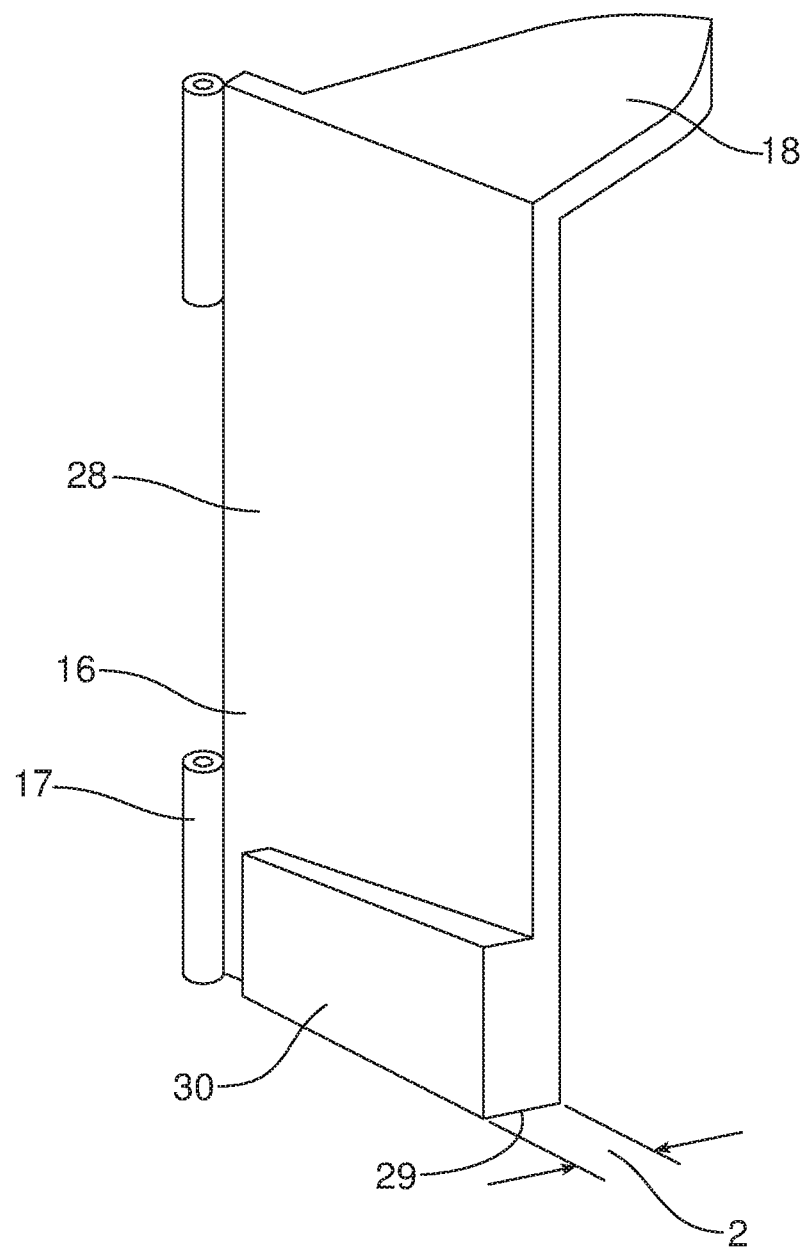
Figure 6:
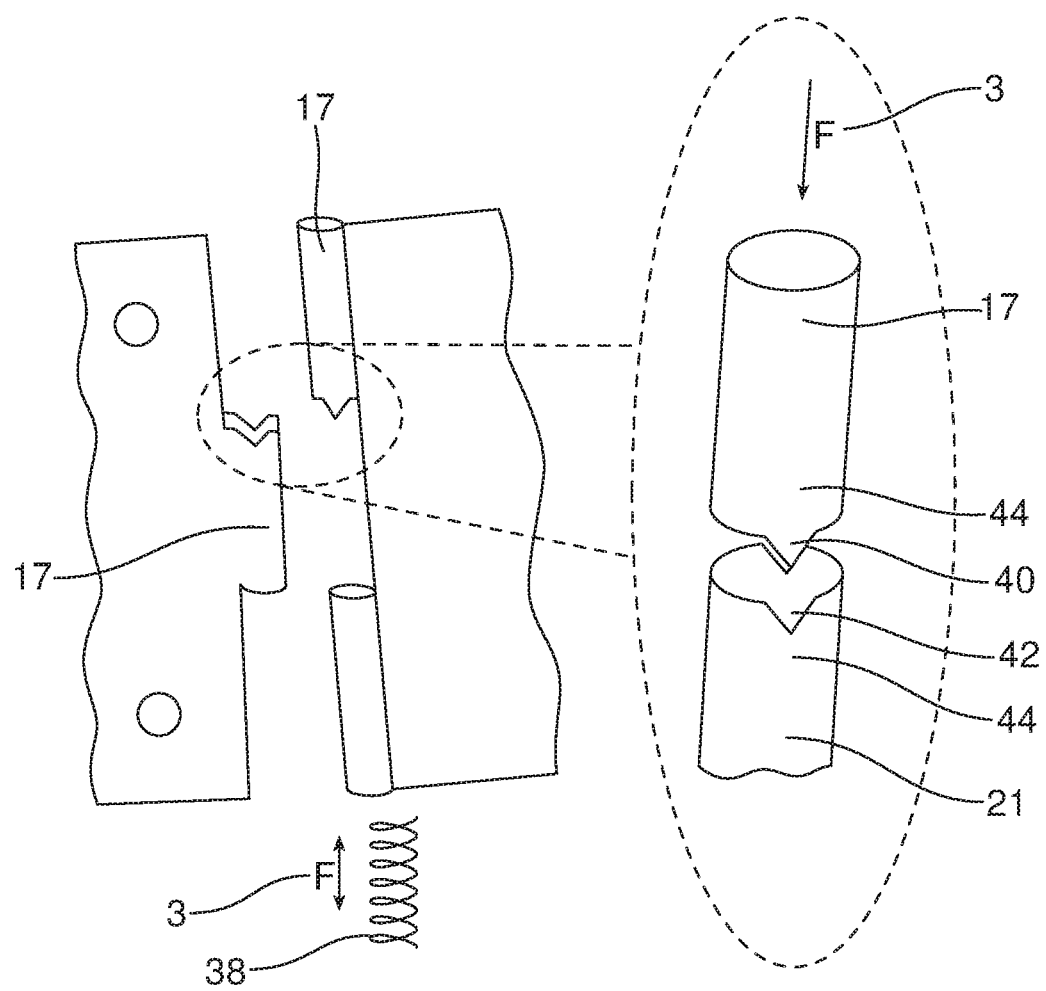
Figure 7:
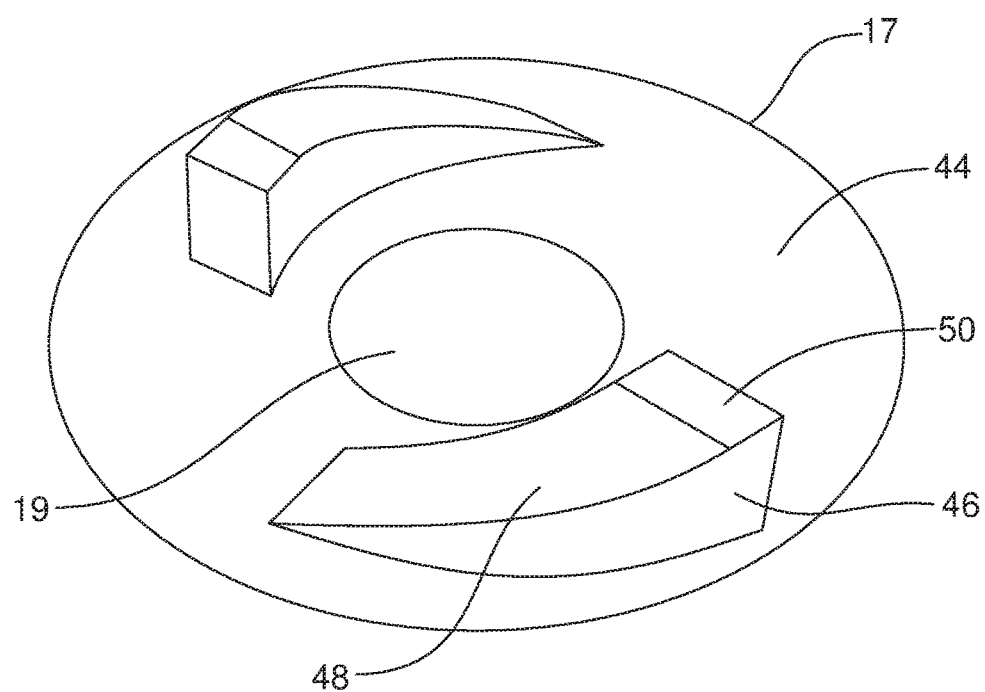

Further advantageous embodiments of the device are disclosed in the following description of the figures. In the drawing FIG. 1 shows a loading space with a support means and a loading surface in a second, raised position, FIG. 2 shows a plan view of the support means with a hinge, wherein the support means is positioned in a pivoted-in and a pivoted-out position, FIG. 3 shows an exploded view of the support means with a torsional spring, FIG. 4 shows a side view of a section through the support means, FIG. 5 shows a perspective view of the support means, FIG. 6 shows the hinge with a locking means formed by a locking projection and a recess at axial ends of knuckles of the hinge, and FIG. 7 shows an axial end with an alternative ramp-like locking means.

In the different figures, identical parts are always provided with the same reference numbers, which is why they are usually also only described once.

DETAILED DESCRIPTION

FIG. 1 shows a device for changing the volume of a storage space or loading space 10 in a vehicle. The loading space 10 may be a luggage space which is located behind a last row of seats 11 in a passenger compartment 13 of the vehicle, for example.

The loading space 10 has a movable loading surface 12 which forms the floor of the loading space 10. The loading surface 12 is shown using dotted lines in FIG. 1. In addition, the volume of the loading space 10 is delimited by side walls 14 arranged on the left and right of the loading surface 12. The side walls 14 are covered with a side trim panel 24 which faces the inside of the storage space 10.

In the side trim panel 24, so in the side walls 14, at least one recess is formed in a lower region close to the floor. A support 16 is arranged in this recess in each case. The support 16 is movably arranged along a pivot direction 1. At an upper end 26 in the drawing plane, the support 16 has a support surface 18 on which the movable loading surface 12 is placed. The movable loading surface 12 in FIG. 1 is positioned in a raised, so in a second, position. The raised, so second, position of the loading surface 12 is characterized in that the loading surface 12 is arranged on the support surfaces 18. At least two support 16 can be arranged in the loading space 10, wherein at least one support 16 is arranged on the left side wall 14, and at least one support 16 on the right, side wall.

The support surface 18 is triangular in design. Furthermore, the entire cross section of the support 16 may be triangular in design and have the same cross section as the support surface 18. All three sides of the support surface 18 in this case may have a wall extending in the vertical direction. Alternatively, only one side of the support surface 18, or two sides of the support surface 18, may have a wall which follows a vertical projection of the contour of the support surface 18. At one end of the support 16 opposite the support surface 18 is configured a support point 29, or else a support surface 29, with which the support 16 rests on an underfloor 22. In this way, a torque which is created by a load on the loading surface 12 and a lever of the support surface 18 is acted against.

A plan view of the triangular support 16 is shown in FIG. 2. The support 16 is shown in a pivoted-in position 32 (dotted lines) and in a pivoted-out position 34. The pivoting-in and pivoting-out takes place in a pivoting direction 1 about a perpendicular pivot axis 20 which is formed by a hinge 21. A corner of the triangularly structured cross section of the support 16 is arranged on the pivot axis 20, so that the triangular cross section rotates about this corner arranged on the pivot axis 20 in the pivoting direction 1.

The hinge 21 is oriented perpendicularly to the loading surface 12 which rests on the support surface 18. In addition, the hinge 21 is integrated in the side trim panel 24, so in the side wall 14. The hinge 21 is arranged alongside an edge of the recess in the side trim panel 24 in such a manner that it does not project into the loading space 10. It is concealed by a faceplate 31, so that it is not visible when viewed from the loading space 10. The side trim panel 24 is provided with a covering 27 which may be fabric, leather, plastic or a felt-like material. The faceplate 31 may be made from the covering 27. The faceplate 31 is preferably T-shaped and a leg of the faceplate 31 is arranged between the edge of the recess and the hinge 21. The faceplate 31 may be arranged in the side trim panel as a reinforcing frame.

The hinge is made of bushings 17 arranged axially to one another in a concentric manner, said bushings being connected to one another by a bolt 19. The bolt 19 is inserted through the bushings 17. At least two bushings 17 are present in the hinge, wherein at least one bushing 17 is attached to the support 16 and one bushing 17 is attached to the side trim panel 24 or side wall 14, for example. As can best be seen in FIG. 3, two bushings 17 are arranged on the support 16 which are spaced apart from one another in such a manner that the bushing 17 arranged on the side trim panel 24 or on the side wall 14 can be arranged between them both.

The pivoted-in position 32 of the triangular support 16 is depicted schematically by dotted lines. The support 16 in this case is completely inserted in an intermediate space 25 which lies between the side wall 14 and the side trim panel 24. The side 28 of the support 16 on the loading space side fits closely around the contour of the side trim panel 24 in this case. The support 16 does not project beyond the side trim panel 24 into the storage space 10 in the pivoted-in position 32.

In the pivoted-out position 34 the support 16 projects into the storage space 10. In this way, the support surface 18 in the loading space 10 is exposed, so that the loading surface 12 can be arranged on the support surface 18.

The pivoting-out of the support 16 is supported by means of a spring 23 which is preferably a torsional spring. The spring 23 is fitted in the pivot axis 20 and causes a pretension acting in the loading space 10, so that the support 16 can automatically pivot out into the loading space 10.

So that the highest possible load is supported by the support 16 on the loading surfaces 12, there is at least one support point 29 or one support surface on the underfloor 22. The support point 29 is preferably arranged on a corner of the triangular support 16 which is spaced as far as possible from the pivot axis 20. In this way, a high loading torque can be opposed. The support point is formed by the triangular legs which lie with their surface opposite the support surface 18 on the underfloor 22.

An exploded view of the support 16 with a hinge 21 as the pivot axis 20 is shown in FIG. 3. The support 16 has only one planar wall 35 on the support surface 18 which is rectangular in shape. The other sides of the triangular support surface 18 have no wall. The support 16 may have a substantially L-shaped profile. The support surface 18 which preferably has a triangular contour is formed on an upper end 26 of the wall 35 in a perpendicular manner The pivot axis 20 is formed on a longitudinal side of the wall 35, wherein the pivot axis 20 may be formed from the hinge 21, for example, which may in particular comprise two bushings 17 on an upper and on a lower end of the longitudinal side of the wall 35.

The hinge 21 furthermore comprises a further bushing 17 which is fastened to a holding means 37. The holding means 37 may be created by the side wall 14 or by the side trim panel 24. This further bushing 17 is arranged between the two bushings 17 on the support means side. A bolt 19 is inserted through the bushings 17 arranged concentrically inside one another. The bolt 19 runs along the pivot axis 20.

Furthermore, a torsional spring 23 is arranged concentrically to the pivot axis, through which the bolt 19 is conducted. The torsional spring 23 has two legs, one of which is connected to the support 16 and the other to the side trim panel 24 or the side wall 14, so that there is pretensioning of the support 16.

The bolt 19 is preferably received in the bushings 17 in a captive manner, which is why a screw-on nut 36 is provided on at least one side. In this case the bolt 19 is most easily insertable through the bushings 17 from top to bottom, viewed in the drawing plane. The bolt 19 can be suitably supported on an end on the floor side, so that the pivot axis is supported. For this purpose, correspondingly configured elements may be arranged on the underfloor 22.

The loading surface 12 is shown in a first, lowered position in FIG. 4. In this case, the support 16 is pivoted in so that a side 28 of the support 16 on the loading space side does not project into the loading space 10. The support 16 is countersunk within the recess in the side wall 14, wherein a gap between the side wall 14 and the support 16 is covered by the faceplate 31. This means that the gap is not visible.

In the first position, the loading surface 12 is arranged below the support surface 18. The loading surface 12 is positioned on a lower end of the support 16. Adjacent to an edge 15 of the loading surface 12, a projection 30 is formed on the support 16. The projection 30 rises from the side 28 of the support 16 and extends in the direction of the loading space 10. The projection 30 may rise by approximately 4 mm, for example. The side 28 is spaced apart from the edge 15 by the projection 30 by a distance 2, said distance being roughly four mm The side 28 opposite a surface of the side wall 14 facing the inside is preferably displaced into the intermediate space 25. In this way, it is ensured that the side 28 does not project into the loading space 10, but is at least flush with, or even displaced inwards to, a surface of the side wall 14 facing the inside 10.

A perspective view of the support 16 with the projection 30 is shown in FIG. 5. The projection 30 is wedge-shaped and integrally formed on the support 16. It may be formed from the same material as the support 16. In this case, the projection 30 is enlarged in a wedge shape starting from the pivot axis 20. The projection 30 is formed on a lower end opposite the support surface 18 on the support 16. The projection 30 extends along the edge of the wall 28 of the support 16. The projection 30 is formed on a lower corner of the wall 28 which is able to form the support point 29 of the support 16. Hence, a good support of the support 16, and of the pivot axis 20 is guaranteed.

A locking means is shown in FIG. 6 which is formed from a locking projection 40 and a recess 42. The locking projection 40 is formed on an axial end 44 of a bushing 17, while the recess 42 is formed on an axial end 44 of an opposite bushing 17. The recess 42 is configured substantially to match the locking projection 40.

The locking means is preferably used for fixing the support 16 in a pivoted-in position 32. Alternatively, it may also be used for engaging the support 16 in a pivoted-out position 34. If the bushings 17 provided with the locking projection 40 and the recess 42 are rotated relative to one another until the locking projection 40 engages with the recess 42, a further rotation of the bushings 17 relative to one another is prevented. In this way, a support 16 which is located in a pivoting movement in the pivoting direction 1 can be engaged.

In order to release the support 16 from the engaged state, an axial force 3 must be produced along the pivot axis 20, so that the locking projection 40 is removed from the recess 42. This axial force 3 can be produced by a compression spring 38, for example. The compression spring 38 may be configured as a helical spring. It is also conceivable for the torsional spring 23 to be connected to the function of a pressure spring 38, so that only one spring is required overall for pretensioning in the pivot direction 1 and the axial force for disengaging.

An alternative locking means is shown in FIG. 7 which realizes a locking function via at least one ramp 46. The ramp 46 is arranged at one axial end 44 of the bushing 17. Two ramps 46 are arranged in FIG. 7, the incline thereof is shown in the same direction. The ramps 46 run about the bolt 19 in the manner of a circle segment.

The inclined plane 48 of the ramp 46 springs up from the axial end 44 of the bushing 17 and changes into a locking plane 50 at the highest point of the ramp 46. If, for example, a cam is formed as the lock extension on an opposite bushing 17 which extends axially from an axial end 44 of the opposite bushing 17 and lies on the axial end 44 of the bushing 17 with the ramps 46, then the cam can slide through a relative rotation of the two bushings 17 along the inclined plane 48 as far as the locking plane 50. Since the locking plane 50 does not produce any downhill driving force in respect of the inclined plane 48, the cam can be mounted in a force-free manner on the locking plane 50, which means that there is no automatic rotation of the bushings 17 relative to one another. In this way, the locking means 16 is more or less engaged.

The preceding embodiments in FIGS. 1 to 7 mean that a device can be combined in which the loading surface 12 can be moved by hand into a first position and a second position. For example, the loading surface 12 can be raised with one hand until it is lifted above the support surface 18. The torsional spring 23 means that the support 16 can be automatically pivoted out into the loading space 10 on the left and right after they have been disengaged. The disengagement may take place using the second hand. The loading surface 12 can now be placed on the supporting surface 18.

In order to convey the loading surface 12 from the second, raised position into the first, lowered position, said loading surface may once again be lifted with one hand, while the support 16 can be engaged using a second hand. The loading surface 12 can be lowered onto the underfloor 22, since the supporting surface 18 of the support 16 is countersunk in the side trim panel 24.

It is also conceivable that during the lowering of the loading surface 12 for positioning in the first position, the edge 15 of the loading surface 12 may be pushed against the projection 30 to force the support 16 in the pivoting direction 1 so that the support 16 automatically engages in the pivoted-in position 32. Hence, following the lifting of the loading surface 12 for a positioning in the second position, a separate manual disengagement of the support 16 can be dispensed with. The projection 30 may project at least so far into the loading space 10 that a reliable disengagement of the support 16 is able to take place. For this purpose, the projection 30 may exhibit an incline on its upper side, which incline is acted upon by the edge 15 during the lowering of the loading surface 12 and generates an outward force in the pivoting direction 1 which can in turn bring about a disengagement.

What is claimed:

1. A device for changing a volume of a loading space in a vehicle, comprising a loading surface, a side wall and at least one support arranged in the side wall and pivotable between a pivoted-in position and a pivoted-out position, wherein the at least one support has a support surface upon which the loading surface is mounted in a raised position, wherein the at least one support has a pivot axis oriented perpendicularly to the loading surface, the at least one support being supported on an underfloor below the loading surface in the pivoted-out position.

2. The device as claimed in claim 1, wherein the pivot axis is perpendicular to the underfloor.

3. The device as claimed in claim 2, wherein the pivot axis is arranged within a side trim panel on the side wall.

4. The device as claimed in claim 3, wherein in the pivoted-out position the support projects from the side trim panel and the support surface projects into the loading space.

5. The device as claimed in claim 4, wherein the support is pivotable into the side trim panel and is flush with the side wall in the pivoted-in position.

6. The device as claimed in claim 5, wherein the support surface faces upward.

7. The device as claimed in claim 6, wherein the support surface has a substantially triangular contour.

8. The device as claimed in claim 7, wherein one corner of said support surface is arranged on the pivot axis.

9. The device as claimed in claim 8, wherein the support has a triangular cross section identical to the support surface.

10. The device as claimed in claim 9, wherein the support rests with at least one support point on the underfloor in the pivoted-out position.

11. The device as claimed in claim 10, wherein the support has a projection on a loading space side facing the loading surface wherein said projection extends in a wedge-shape oriented away from the pivot axis.

12. The device as claimed in claim 1, wherein the support surface faces upward.

13. The device as claimed in claim 12, wherein the support surface has a substantially triangular contour.

14. The device as claimed in claim 13, wherein one corner of said support surface is arranged on the pivot axis.

15. The device as claimed in claim 14, wherein the support has a triangular cross section identical to the support surface.

16. The device as claimed in claim 15, wherein the support rests with at least one support point on the underfloor in the pivoted-out position.

17. The device as claimed in claim 16, wherein the support has a projection on a loading space side facing the loading surface wherein said projection extends in a wedge-shape oriented away from the pivot axis.

18. The device as claimed in claim 1, wherein the support rests with at least one support point on the underfloor in the pivoted-out position.

19. The device as claimed in claim 18, wherein the support has a projection on a loading space side facing the loading surface wherein said projection extends in a wedge-shape oriented away from the pivot axis.

* * * * *